United States Patent
Lai et al.

(10) Patent No.: US 9,575,249 B2
(45) Date of Patent: Feb. 21, 2017

(54) METHOD OF MAKING A METAL GRATING IN A WAVEGUIDE AND DEVICE FORMED

(71) Applicant: TAIWAN SEMICONDUCTOR MANUFACTURING COMPANY, LTD., Hsinchu (TW)

(72) Inventors: Jui Hsieh Lai, Taoyuan (TW); Ying-Hao Kuo, Hsinchu (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 382 days.

(21) Appl. No.: 13/959,212

(22) Filed: Aug. 5, 2013

(65) Prior Publication Data

US 2015/0036991 A1   Feb. 5, 2015

(51) Int. Cl.
*G02B 6/10*   (2006.01)
*G02B 6/124*   (2006.01)
*G02B 6/12*   (2006.01)

(52) U.S. Cl.
CPC ..... *G02B 6/124* (2013.01); *G02B 2006/12176* (2013.01)

(58) Field of Classification Search
CPC ................. G02B 6/124; G02B 2006/12176
See application file for complete search history.

(56) References Cited

U.S. PATENT DOCUMENTS

| | | | |
|---|---|---|---|
| 7,670,758 B2* | 3/2010 | Wang | G02B 5/1857 427/162 |
| 7,710,040 B2* | 5/2010 | Gorrell | H01J 25/00 315/39.51 |
| 2003/0053733 A1* | 3/2003 | Wang et al. | 385/10 |
| 2003/0053734 A1* | 3/2003 | Wang et al. | 385/10 |
| 2006/0120421 A1* | 6/2006 | Matsuda et al. | 372/43.01 |
| 2008/0225918 A1* | 9/2008 | Achtenhagen et al. | 372/44.01 |

* cited by examiner

*Primary Examiner* — Sung Pak
(74) *Attorney, Agent, or Firm* — Slater Matsil, LLP

(57) ABSTRACT

A method of making a grating in a waveguide includes forming a waveguide material over a substrate, the waveguide material having a thickness less than or equal to about 100 nanometers (nm). The method further includes forming a photoresist over the waveguide material and patterning the photoresist. The method further includes forming a first set of openings in the waveguide material through the patterned substrate and filling the first set of openings with a metal material.

20 Claims, 8 Drawing Sheets

US 9,575,249 B2

METHOD OF MAKING A METAL GRATING IN A WAVEGUIDE AND DEVICE FORMED

BACKGROUND

Waveguides are used to control a propagation of light from one element to another. Waveguides are used in image sensors, optical communications, opto-electric circuits, spectrum analysis devices as well as other technologies. Diffraction gratings are used in waveguides to separate different wavelengths of a light beam or to combine different wavelengths into a single light beam.

A transmission grating separates an incoming light beam into component wavelengths by refracting the incident light beam. An angle of refraction is determined in part by the wavelength of the component wavelength. Similarly, the transmission grating combines light of different wavelengths into a single output light beam by refracting the incident light so that multiple wavelength input are combined into the single output light beam.

A reflecting grating separates the incoming light beam into component wavelengths by reflecting the incident light beam. An angle of reflection is determined in part by the wavelength of the component wavelength. Similarly, the reflective grating combines light of different wavelengths into the single output light beam by reflecting the incident light so that multiple wavelength input are combined into the single output light beam.

BRIEF DESCRIPTION OF THE DRAWINGS

One or more embodiments are illustrated by way of example, and not by limitation, in the figures of the accompanying drawings, wherein elements having the same reference numeral designations represent like elements throughout. It is emphasized that, in accordance with standard practice in the industry various features may not be drawn to scale and are used for illustration purposes only. In fact, the dimensions of the various features in the drawings may be arbitrarily increased or reduced for clarity of discussion.

DETAILED DESCRIPTION

The following disclosure provides many different embodiments, or examples, for implementing different features of the invention. Specific examples of components and arrangements are described below to simplify the present disclosure. These are examples and are not intended to be limiting.

Figure 1:
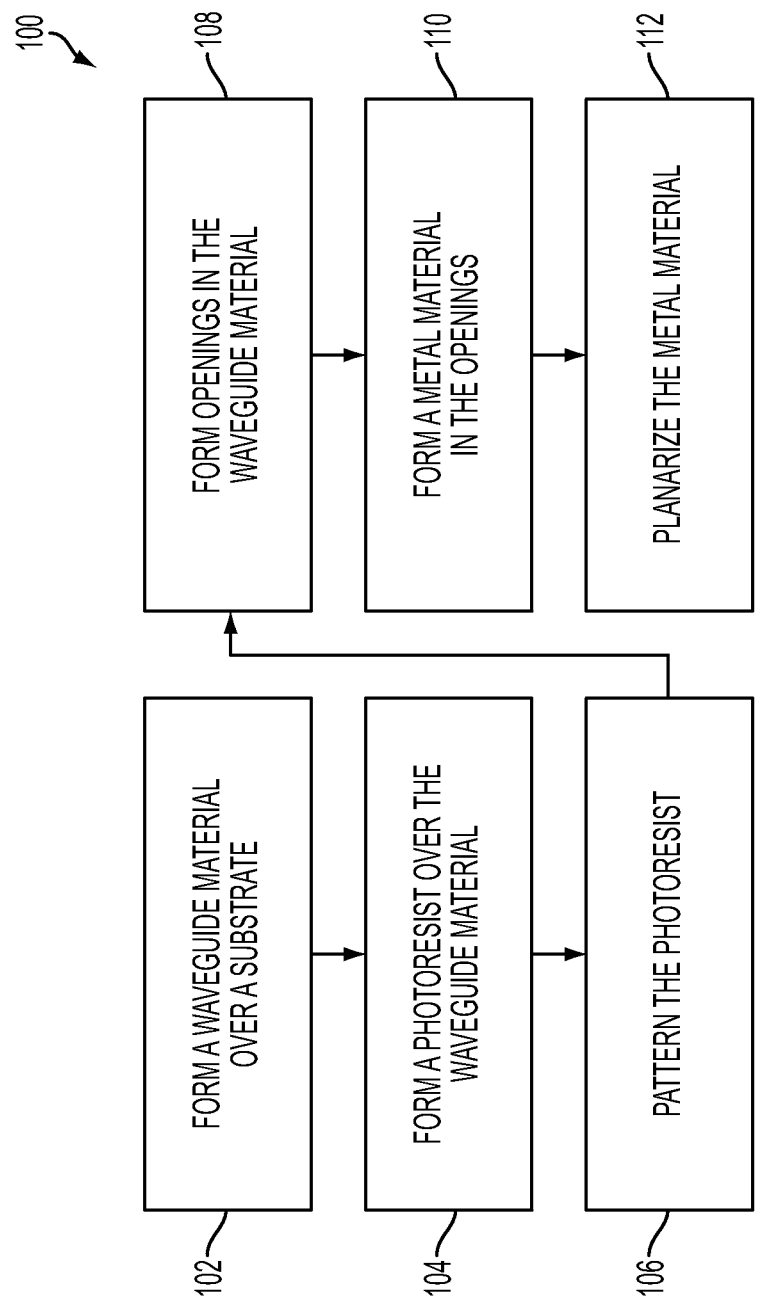
FIG. 1 is a flow chart of a method of making a metal grating in a waveguide in accordance with one or more embodiments.

FIG. 1 is a flow chart of a method 100 of making a metal grating in a waveguide in accordance with one or more embodiments. Method 100 begins with operation 102 in which a waveguide material is formed over a substrate. In some embodiments, the waveguide material is formed on the substrate by a chemical vapor deposition (CVD) process, a physical vapor deposition (PVD) process, an atomic layer deposition (ALD) process, an epitaxial process, or another suitable formation process. In some embodiments, an insulating layer (not shown) is formed between the waveguide material and the substrate. In some embodiments, the insulating layer is formed by a CVD process, a PVD process, an ALD process, an epitaxial process, or another suitable process.

A thickness of the waveguide material over the substrate is less than or equal to about 100 nanometers (nm). In some embodiments, the thickness of the waveguide material over the substrate is less than or equal to about 75 nm. The thickness of the waveguide material in method 100 is reduced with respect to other methods due to the ability of method 100 to produce highly reflective gratings with increased critical dimension (CD) control in comparison with other methods.

Figure 2A:
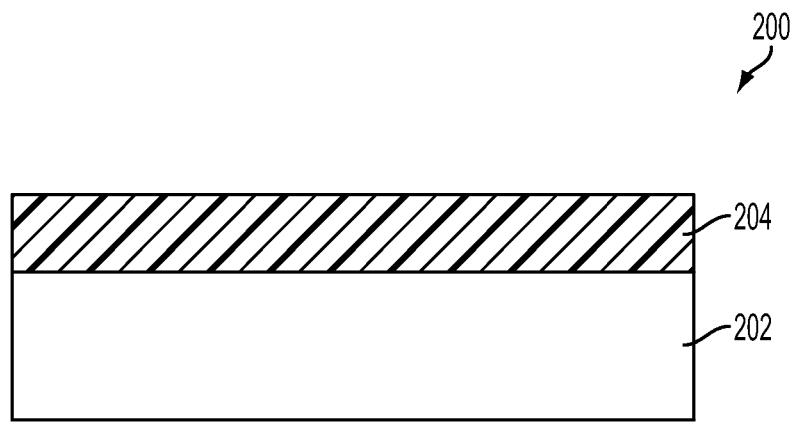
FIGS. 2A-2F are cross sectional views of a waveguide structure during various stages of production in accordance with one or more embodiments.

FIG. 2A is a cross-sectional view of a waveguide structure 200 following operation 102 in accordance with one or more embodiments. Waveguide structure 200 includes a substrate 202 and a waveguide material 204 over the substrate. A thickness of waveguide material 204 is equal to or less than about 100 nm. In some embodiments, the thickness of waveguide material 204 is less than about 75 nm.

Substrate 202 is used to support waveguide material 204. In some embodiments, substrate 202 is a dielectric layer or printed circuit board (PCB). In some embodiments, substrate 202 includes active circuitry such as photo detectors, light emitters, transistors or other suitable active circuitry. In some embodiments, substrate 202 includes an interconnect structure between the active circuitry and waveguide material 204. In some embodiments, substrate 202 includes silicon, silicon-on-insulator (SOI), silicon with defective crystallinity, diamond or other suitable materials.

Waveguide material 204 is over substrate 202. Waveguide material 204 is capable of allowing propagation of a wide spectrum of wavelengths. In some embodiments, the wavelengths include visible light, ultra-violet (UV) light, infrared (IR) light or other suitable wavelengths. In some embodiments, wavelength material 204 includes a dielectric material such as silicon dioxide ($SiO_2$), silicon carbide (SiC), carbon nitride (CN), silicon oxynitride (SiON), silicon nitride (SiNx), or another suitable dielectric material. In some embodiments, wavelength material 204 includes BLACK DIAMOND™ by Applied Materials.

In some embodiments, an insulating layer (not shown) is between substrate 202 and waveguide material 204. In some embodiments, the insulating layer is a transparent material. In some embodiments, the insulating layer includes $SiO_2$, SiC, CN, SiNx, silicon oxycarbide (SiOC), or other suitable materials. In some embodiments, the insulating layer includes a same material as waveguide material 204. In some embodiments, the interconnect structure for active circuitry in substrate 202 is formed in the insulating layer. In some embodiments, the insulating layer is a multi-layer structure. In some embodiments, the insulating layer is a single layer. In some embodiments, a thickness of the insulating layer ranges from about 100 nm to about 10,000 nm.

Returning to FIG. 1, method 100 continues with operation 104 in which a photoresist is formed over the waveguide material. In some embodiments, the photoresist is formed by a spin-on process, a PVD process or another suitable formation process. One of ordinary skill in the art will appreciate that various photoresist thicknesses are able to be achieved by using different types of photoresist materials or by varying the spin speed used during formation of the photoresist. In some embodiments, the photoresist includes a positive photoresist material. In some embodiments, the photoresist includes a negative photoresist material. In some embodiments, additional layers such as anti-reflective (AR) coatings, hard mask layer, or other suitable layers are formed between the photoresist and the waveguide material.

Figure 2B:
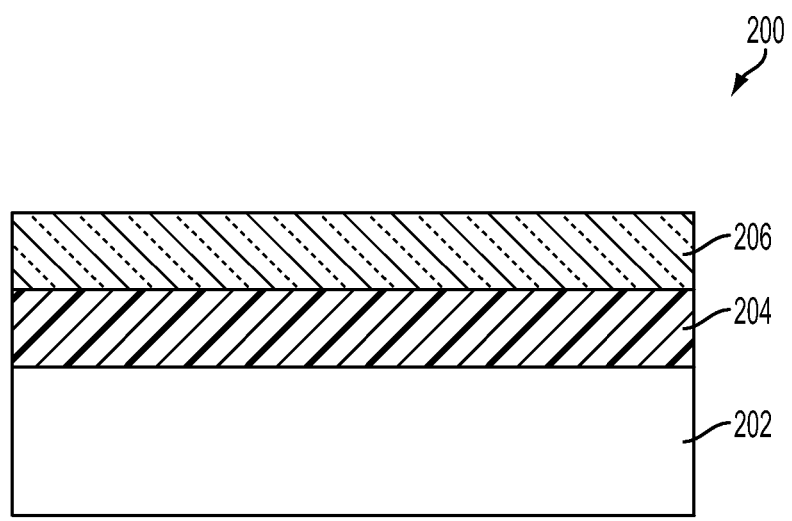

FIG. 2B is a cross-sectional view of a waveguide structure 200 following operation 104 in accordance with one or more embodiments. Waveguide structure 200 includes a photoresist 206 over waveguide material 204. In some embodiments, photoresist 206 includes a positive photoresist material. In some embodiments, photoresist 206 includes a negative photoresist material. In some embodiments, using a positive photoresist reduces thermal expansion or shrinkage in comparison with a negative photoresist. The reduced thermal expansion or shrinkage helps to improve CD control. A thickness of photoresist 206 ranges from about 100 nm to about 500 nm.

Returning to FIG. 1, method 100 continues with operation 106 in which the photoresist is patterned. In some embodiments, the photoresist is patterned using a photolithography process. In some embodiments, the photolithography process uses UV light to pattern the photoresist. The photolithography light causes exposed portions of the photoresist to become more soluble to a developer solution, while portions of the photoresist remain insoluble to the developer solution. The developer solution is then used to remove the more soluble areas leaving the patterned photoresist with a structure having openings therein.

In some embodiments, multiple sets of openings are formed during operation 106. In some embodiments, at least one set of openings has a different period from another second of openings. In some embodiments, each set of openings formed in the photoresist are formed simultaneously. In some embodiments, at least one set of openings is formed subsequent to at least another set of openings.

Figure 2C:
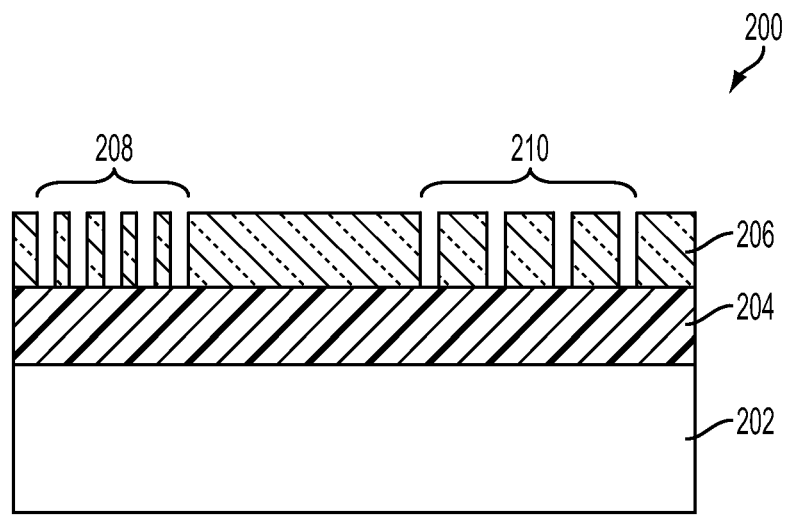

FIG. 2C is a cross-sectional view of a waveguide structure 200 following operation 106 in accordance with one or more embodiments. Waveguide structure 200 includes openings 208 and 210 formed in photoresist 206. In some embodiments, openings 208 have a different period than openings 210. In some embodiments, openings 208 have a same period as openings 210. A period of openings 208 and openings 210 is selected to correspond to a desired diffraction wavelength.

A diffraction grating is able to be defined based on the equation:

$$m\lambda = d(\sin \alpha + \sin \beta) \quad (1)$$

$$\text{Wavelength} = 2*N*\text{Pitch}/m$$

where m is the order of diffraction, λ is the wavelength being diffracted, d is the grating pitch, α is the angle of incidence, and β is the angle of diffraction, and N is an integer. A wavelength to be diffracted and a diffraction order are predetermined by a user. The angle of incidence is adjustable based on the orientation of openings 208 and openings 210. A designer is then able to determine the grating pitch so as to diffract the predetermined diffraction order of the predetermined wavelength of light based on the incident angle determined by the orientation of openings 208 and 210. In some embodiments, a grating pitch of openings 208 and openings 210 ranges from about 100 nm to about 1000 nm.

In some embodiments, openings 208 and openings 210 have a width ranging from about 10 nm to about 300 nm. The width of openings 208 and 210 determines a width of gratings formed using the openings. If the width of openings 208 and openings 210 is too great, the material of the gratings will absorb a significant amount of incident light thereby reducing an overall intensity of light exiting the grating. If the width of openings 208 and openings 210 is too small, the grating will not be able to efficiently diffract incident light.

Returning to FIG. 1, method 100 continues with operation 108 in which openings are formed in the waveguide material. Openings are formed in the waveguide material through the patterned photoresist. In some embodiments, the openings in the waveguide material are formed by an etching process, such as a dry etching process, a wet etching process, a reactive ion etching (RIE) etching process, a plasma-assisted etching process or another suitable material removal process. In some embodiments, the photoresist is removed during operation 108. That is, the material removal process used to form the openings in the waveguide material simultaneously removes the material of the patterned photoresist. In some embodiments, the patterned photoresist is removed in a process subsequent to operation 108.

Figure 2D:
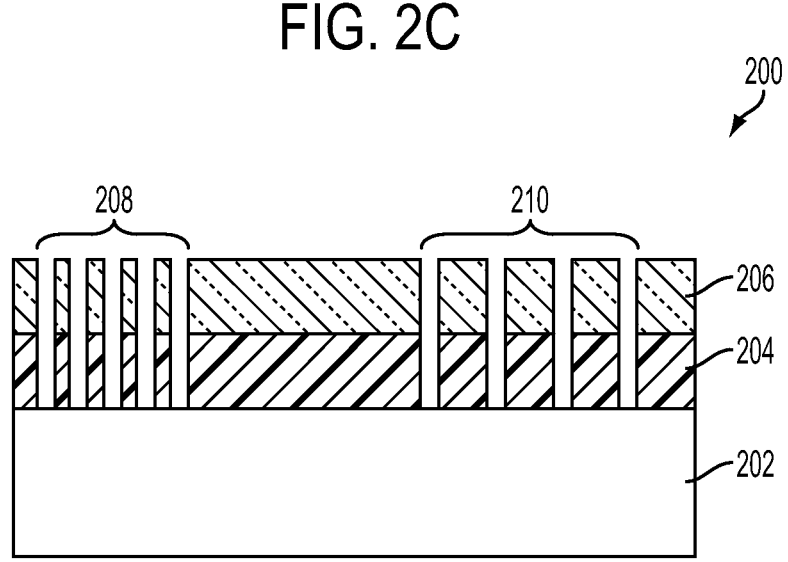

FIG. 2D is a cross-sectional view of waveguide structure 200 following operation 108 in accordance with one or more embodiments. Waveguide structure 200 includes openings 208 and 210 extending through photoresist 206 and waveguide material 204. A period of openings 208 and openings 210 in waveguide material 204 is substantially the same as the period of period of openings 208 and openings 210 in photoresist 206. In the embodiment of FIG. 2D, photoresist 206 is removed subsequent to forming openings 208 and openings 210 in waveguide material 210.

In some embodiments, openings 208 and openings 210 extend completely through waveguide material 204. In some embodiments, openings 208 and openings 210 extend less than completely through waveguide material 204. In some embodiments, a depth of openings 208 and openings 210 in waveguide material 204 independently range from about 20 nm to about 100 nm.

Returning to FIG. 1, method 100 continues with operation 110 in which a metal material is formed in the openings in the waveguide material. In some embodiments, the metal material is formed by electroplating, sputtering, PVD, ALD or another suitable formation process. The metal material fills the openings in the waveguide material and extends over a top surface of the waveguide material. In some embodiments, the metal material includes copper, aluminum, alloys thereof or other suitable metal materials. In some embodiments, the metal material is formed over the patterned photoresist. In some embodiments, the photoresist is removed prior to forming the metal material in the openings. In some embodiments, the patterned photoresist material is removed by an etching process, an ashing process, or other suitable removal processes.

Figure 2E:
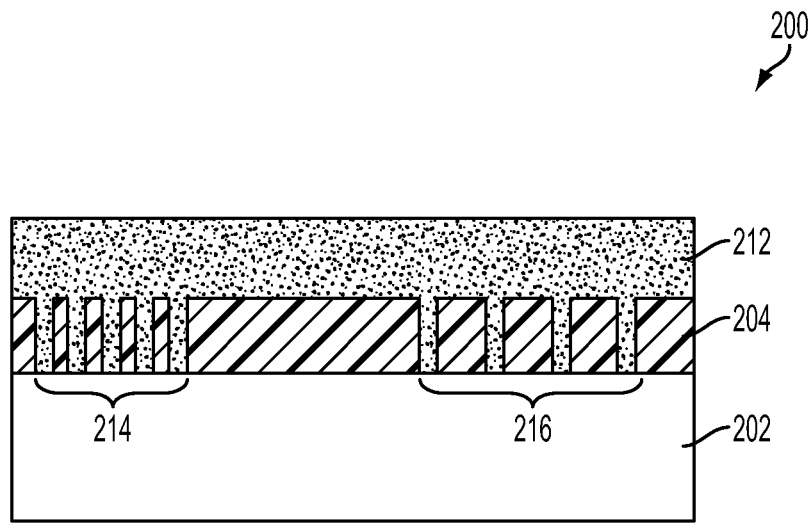

FIG. 2E is a cross-sectional view of waveguide structure 200 following operation 110 in accordance with one or more embodiments. Waveguide structure 200 includes a metal material 212 over waveguide material 204. Metal material 212 fills openings 208 to form a first grating 214 and fills openings 210 to form a second grating 216. Metal material 212 is over a top surface of waveguide material 204. In the embodiment of FIG. 2E, photoresist 206 was removed prior to forming metal material 212.

In some embodiments, a barrier layer is formed between each portion of metal material 212 filing each opening of openings 208 and openings 210. In some embodiments, the barrier layer includes titanium (Ti), tantalum (Ta), titanium nitride (TiN), tantalum nitride (TaN) or other suitable barrier layer material.

Returning to FIG. 1, method 100 continues with operation 112 in which the metal material is planarized. In some embodiments, the metal material is planarized using a chemical mechanical polishing (CMP) process. In some embodiments, the metal material is planarized using an etching process, a grinding process or another suitable material removal process. In some embodiments, the patterned photoresist is removed during operation 112. Following operation 112, a top surface of the metal material is substantially coplanar with the top surface of the waveguide material.

Figure 2F:
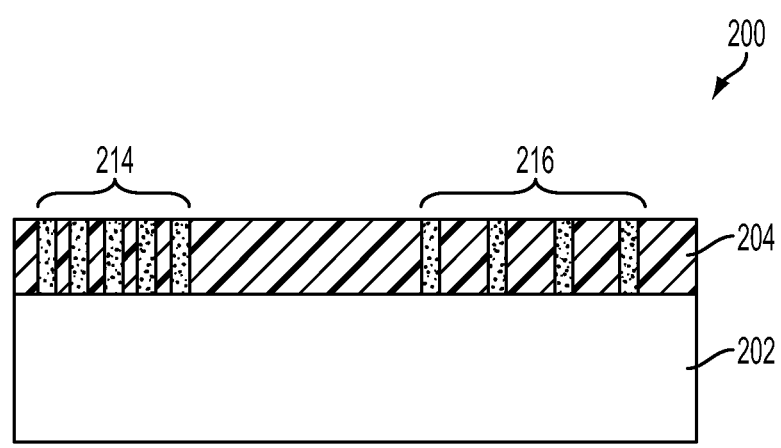

FIG. 2F is a cross-sectional view of waveguide structure 200 following operation 112 in accordance with one or more embodiments. Waveguide structure 200 includes metal material 212 having a top surface substantially coplanar with the top surface of waveguide material 204. Operation 112 removes metal material 212 over the top surface of waveguide material 204. As a result, first grating 214 and second grating 216 have a substantially flat top surface coplanar with the top surface of waveguide material 204.

One of ordinary skill in the art would recognize that additional operations are able to be added to method 100 and an order of operations are able to be adjusted to form a final product.

Figure 3:
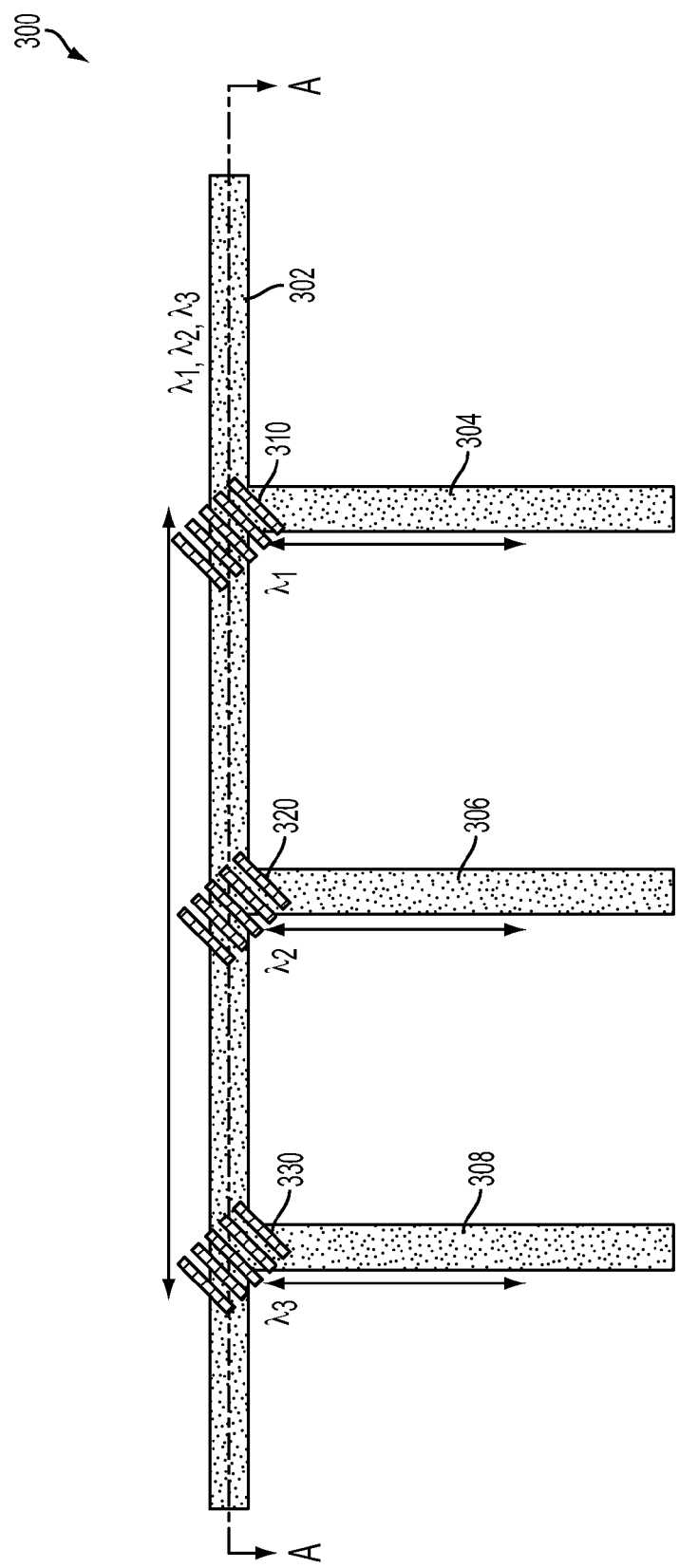
FIG. 3 is a top view of a waveguide structure in accordance with one or more embodiments.

FIG. 3 is a top view of a waveguide structure 300 in accordance with one or more embodiments. Waveguide structure 300 includes a first waveguide 302 extending in a first direction and configured to allow light to propagate along a length of the first waveguide. Waveguide structure 300 further includes a second waveguide 304 extending in a second direction different from the first direction. Second waveguide 304 is configured to allow light to propagate along a length of the second waveguide. Waveguide structure 300 further includes a third waveguide 306 extending in the second direction spaced from second waveguide 304. Third waveguide 306 is configured to allow light to propagate along a length of the third waveguide. Waveguide structure 300 further includes a fourth waveguide 308 extending in the second direction spaced from second waveguide 304 and third waveguide 306. Fourth waveguide 308 is configured to allow light to propagate along a length of the fourth waveguide. In some embodiments, the first direction is perpendicular to the second direction. Waveguide structure 300 further includes a first grating 310 located at an intersection of first waveguide 302 and second waveguide 304. Waveguide structure 300 further includes a second grating 320 located at an intersection of first waveguide 302 and third waveguide 306. Waveguide structure 300 further includes a third grating 330 located at an intersection of first waveguide 302 and fourth waveguide 308.

Waveguide structure 300 is configured to operate as either a beam splitter or a beam combiner. Waveguide structure 300 is capable of operating as a beam splitter by having a multi-wavelength beam of light propagate along first waveguide 302. As the multi-wavelength beam of light is incident on first grating 310, a first wavelength $\lambda 1$ splits off from the multi-wavelength beam of light and propagates along second waveguide 304. The first wavelength $\lambda 1$ is determined by a period of first grating 310. In a non-limiting example, the pitch of first grating 310 is 425 nm, an angle of incidence of the multi-wavelength beam of light on the first grating is 45-degrees, and a reflection angle is 45-degrees. Based on the diffraction equation Eq. (1), first grating 310 splits off a first order of the first wavelength $\lambda 1$ equal to 850 nm.

Similarly, second grating 320 and third grating 330 split off different wavelengths depending on a period of the second grating and the third grating, respectively. In some embodiments, first grating 310 has a different pitch than at least one of second grating 320 or third grating 330. In some embodiments, each of first grating 310, second grating 320 and third grating 330 have a different pitch.

Waveguide structure 300 is capable of operating as a beam combiner by having a light beam with a specific wavelength propagate along at least two of second waveguide 304, third waveguide 306 or fourth waveguide 308. A corresponding grating at an intersection with first waveguide 302 directs the light from the at least two waveguides along the first waveguide to form a multi-wavelength beam of light.

In some embodiments, a number of gratings is more or less than three. In some embodiments, a number of waveguides is more or less than four. In some embodiments, the first direction and the second direction is different from 90-degrees.

Figure 4:
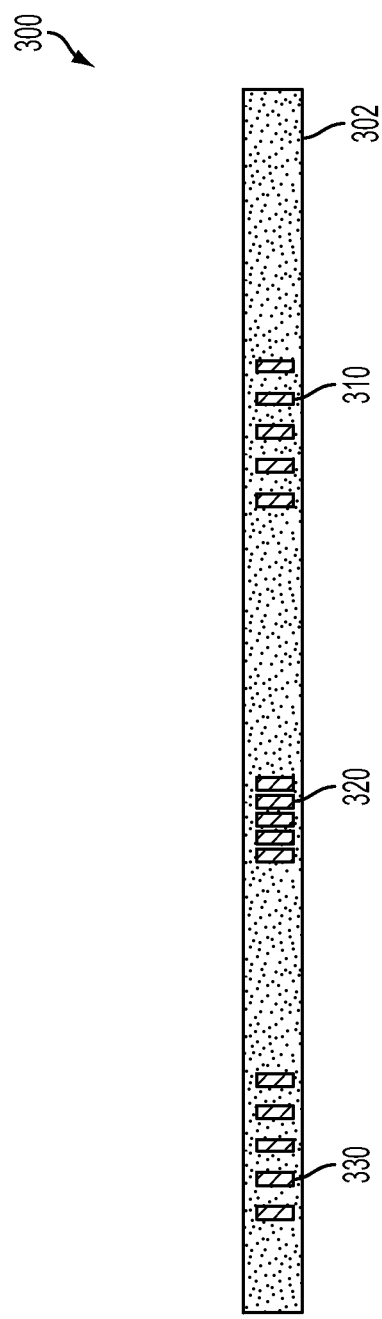
FIG. 4 is a cross sectional view of a waveguide structure in accordance with one or more embodiments.

FIG. 4 is cross sectional view of waveguide structure 300 taken along line A-A of FIG. 3 in accordance with one or more embodiments. First grating 310, second grating 320 and third grating 330 are embedded in first waveguide 302. In some embodiments, a barrier layer separates first waveguide 302 from a material of each of first grating 310, second grating 320 and third grating 330.

Figure 5:
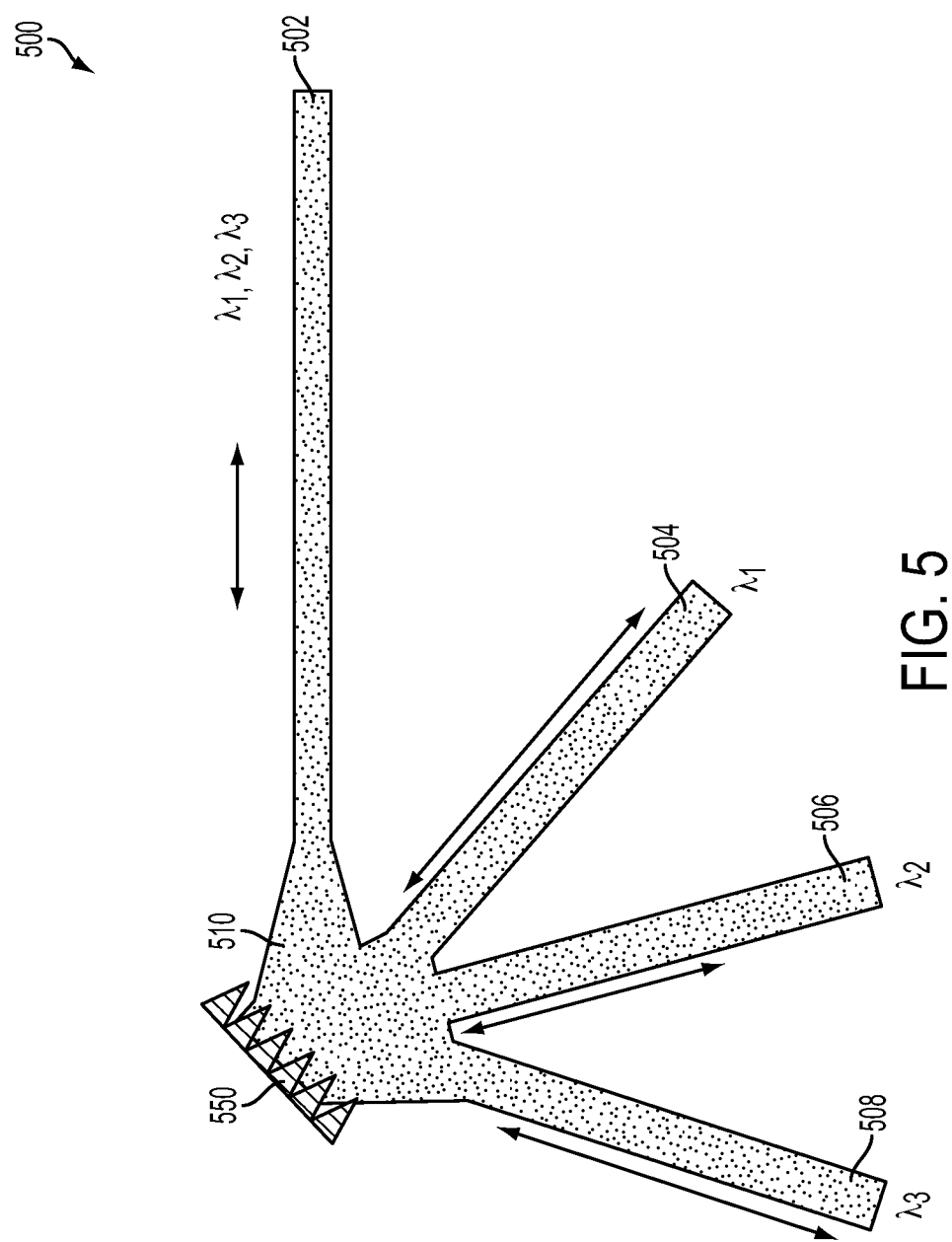
FIG. 5 is a top view of a waveguide structure in accordance with one or more embodiments.

FIG. 5 is a top view of a waveguide structure 500 in accordance with one or more embodiments. Waveguide structure 500 includes a first waveguide 502 extending in a first direction and configured to allow light to propagate along a length of the first waveguide. Waveguide structure 500 further includes a second waveguide 504 extending in a second direction different from the first direction. Second waveguide 504 is configured to allow light to propagate along a length of the second waveguide. Waveguide structure 500 further includes a third waveguide 506 extending in a third direction different from the first direction and the second direction. Third waveguide 506 is spaced from second waveguide 504. Third waveguide 506 is configured to allow light to propagate along a length of the third waveguide. Waveguide structure 500 further includes a fourth waveguide 508 extending in a fourth direction different from the first direction, the second direction, and the third direction. Fourth waveguide 508 is spaced from second waveguide 504 and third waveguide 506. Fourth waveguide 508 is configured to allow light to propagate along a length of the fourth waveguide. First waveguide 502, second waveguide 504, third waveguide 506 and fourth waveguide 508 intersection one another at an intersection structure 510. Waveguide structure 500 includes a grating 550 located at a surface of intersection structure 510 configured to receive light propagating along each of first waveguide 502, second waveguide 504, third waveguide 506 and fourth waveguide 508.

Grating 550 has a prismatic shape. In some embodiments, grating 550 has a triangular prismatic shape. In some embodiments, grating 550 has a different shape. Grating 550 is formed in a similar manner as that described above with respect to method 100 with a variation in shape of the opening in a waveguide material.

Waveguide structure 500 is configured to operate as either a beam splitter or a beam combiner. Waveguide structure 500 is capable of operating as a beam splitter by having a multi-wavelength beam of light propagate along first waveguide 502. As the multi-wavelength beam of light is incident on grating 550, a first wavelength λ1 splits off from the multi-wavelength beam of light and propagates along second waveguide 504. The first wavelength λ1 is determined by a period of grating 550 as well as the angle of incident and the angle of diffraction as shown above in Eq. (1).

Waveguide structure 500 is capable of operating as a beam combiner by having a light beam with a specific wavelength propagate along at least two of second waveguide 504, third waveguide 506 or fourth waveguide 508. Grating 550 at intersection structure 510 directs the light from the at least two waveguides along first waveguide 502 to form a multi-wavelength beam of light.

Figure 6:
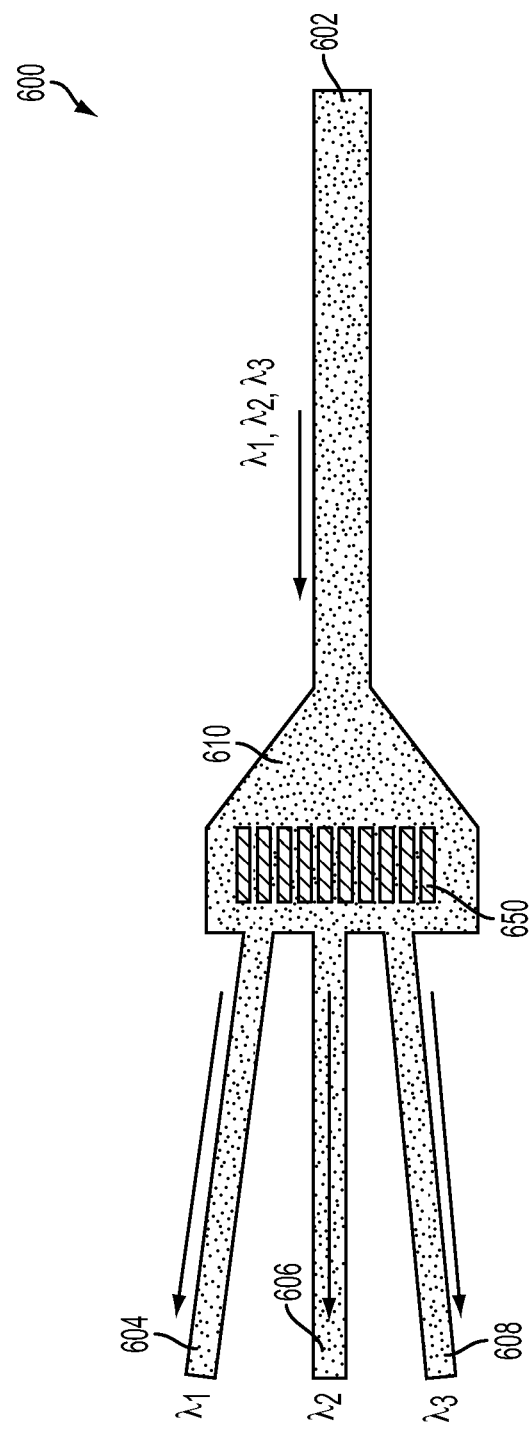
FIG. 6 is a top view of a waveguide structure in accordance with one or more embodiments.

FIG. 6 is a top view of a waveguide structure 600 in accordance with one or more embodiments. Waveguide structure 600 includes a first waveguide 602 extending in a first direction and configured to allow light to propagate along a length of the first waveguide. Waveguide structure 600 further includes a second waveguide 604 extending in a second direction different from the first direction. Second waveguide 604 is configured to allow light to propagate along a length of the second waveguide. Waveguide structure 600 further includes a third waveguide 606 extending in a third direction different from the first direction and the second direction. Third waveguide 606 is spaced from second waveguide 604. Third waveguide 606 is configured to allow light to propagate along a length of the third waveguide. Waveguide structure 600 further includes a fourth waveguide 608 extending in a fourth direction different from the first direction, the second direction, and the third direction. Fourth waveguide 608 is spaced from second waveguide 604 and third waveguide 606. Fourth waveguide 608 is configured to allow light to propagate along a length of the fourth waveguide. First waveguide 602, second waveguide 604, third waveguide 606 and fourth waveguide 608 intersection one another at an intersection structure 610. Waveguide structure 600 includes a transmission grating 650 located in intersection structure 510 configured to receive light propagating along each of first waveguide 602, second waveguide 604, third waveguide 606 and fourth waveguide 608.

Waveguide structure 600 is configured to operate as either a beam splitter or a beam combiner. Waveguide structure 600 is capable of operating as a beam splitter by having a multi-wavelength beam of light propagate along first waveguide 602. As the multi-wavelength beam of light is incident on transmission grating 650, a first wavelength λ1 splits off from the multi-wavelength beam of light and propagates along second waveguide 604. The first wavelength λ1 is determined by a period of transmission grating 650 as well as the angle of incident and the angle of diffraction as shown above in Eq. (1).

Waveguide structure 600 is capable of operating as a beam combiner by having a light beam with a specific wavelength propagate along at least two of second waveguide 604, third waveguide 606 or fourth waveguide 608. Transmission grating 650 at intersection structure 610 directs the light from the at least two waveguides along first waveguide 602 to form a multi-wavelength beam of light.

One aspect of this description relates to a method of making a grating in a waveguide. The method includes forming a waveguide material over a substrate, the waveguide material having a thickness less than or equal to about 100 nanometers (nm). The method further includes forming a photoresist over the waveguide material and patterning the photoresist. The method further includes forming a first set of openings in the waveguide material through the patterned substrate and filling the first set of openings with a metal material.

Another aspect of this description relates to a method of making a grating in a waveguide. The method includes forming a waveguide material over a substrate, the waveguide material having a thickness less than or equal to about 100 nanometers (nm) and forming a photoresist over the waveguide material. The method further includes forming a first set of openings in the waveguide material having a first pitch. Forming the first set of openings includes forming a first set of photoresist openings in the photoresist, and etching the waveguide material through the first set of photoresist openings. The method further includes forming a second set of openings in the waveguide material having a second pitch. Forming the second set of openings includes forming a second set of photoresist openings in the photoresist, and etching the waveguide material through the second set of photoresist openings. The method further includes filling the first set of openings and the second set of openings with a metal material.

Still another aspect of this description relates to a waveguide structure including a substrate and a waveguide material over the substrate, wherein the waveguide material has a thickness less than or equal to about 100 nanometers (nm). The waveguide structure further includes a first metal grating having a first pitch in the waveguide material. A depth of the first metal grating is less than the thickness of the waveguide material, and a top surface of the first metal grating is substantially coplanar with a top surface of the waveguide material.

It will be readily seen by one of ordinary skill in the art that the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

What is claimed is:

1. A method of making a grating in a waveguide, the method comprises:
    forming a waveguide material over a substrate, the waveguide material having a thickness less than or equal to about 100 nanometers (nm), wherein the waveguide material allows propagation of light;
    forming a photoresist over the waveguide material;
    patterning the photoresist;
    forming a first set of openings in the waveguide material through the patterned photoresist;
    filling the first set of openings with a metal material, the filling comprising depositing the metal material over the waveguide material; and
    planarizing the metal material so that a top surface of the metal material is substantially coplanar with a top surface of the waveguide material.

2. The method of claim 1, wherein patterning the photoresist comprises:
    performing a photolithography process on the photoresist; and
    etching the photoresist to form a first set of photoresist openings in the photoresist corresponding to the first set of openings in the waveguide material.

3. The method of claim 2, further comprising forming a second set of openings in the waveguide material through the patterned photoresist.

4. The method of claim 3, wherein forming the second set of openings in the waveguide material comprises forming the second set of openings in the waveguide material having a different pitch than from the first set of openings in the waveguide material.

5. The method of claim 3, wherein patterning the photoresist further comprises etching the photoresist to form a second set of photoresist openings in the photoresist corresponding to the second set of openings in the waveguide material.

6. The method of claim 5, wherein the first set of photoresist openings in the photoresist is formed simultaneously with the second set of photoresist openings in the photoresist.

7. The method of claim 1, further comprising forming an insulation layer between the substrate and the waveguide material.

8. The method of claim 1, further comprising removing the photoresist prior to filling the first set of openings in the waveguide material.

9. The method of claim 1, further comprising removing the photoresist following filling the first set of openings in the waveguide material.

10. A method of making a grating in a waveguide, the method comprises:
- disposing an insulating layer over a substrate, the insulating layer containing an interconnect structure for active devices in the substrate;
- forming a waveguide material over the insulating layer, the waveguide material having a thickness less than or equal to about 100 nanometers (nm), wherein the waveguide material allows propagation of light;
- forming a photoresist over the waveguide material;
- forming a first set of openings in the waveguide material having a first pitch, wherein forming the first set of openings comprises:
  forming a first set of photoresist openings in the photoresist, and
  etching the waveguide material through the first set of photoresist openings;
- forming a second set of openings in the waveguide material having a second pitch, wherein forming the second set of openings comprises:
  forming a second set of photoresist openings in the photoresist, and etching the waveguide material through the second set of photoresist openings; and
- filling the first set of openings and the second set of openings with a metal material.

11. The method of claim 10, wherein the first set of openings in the waveguide material is formed simultaneously with the second set of openings in the waveguide material.

12. The method of claim 10, further comprising removing the photoresist simultaneously with etching the waveguide material through the second set of photoresist openings.

13. The method of claim 10, wherein forming the second set of openings in the waveguide material comprises forming the second pitch different from the first pitch.

14. The method of claim 10, further comprising planarizing the metal material so that a top surface of the metal material is substantially coplanar with a top surface of the waveguide material.

15. The method of claim 10, wherein filling the first set of openings and the second set of openings comprises filling the first set of openings and the second set of openings with copper, aluminum, or alloys thereof.

16. A waveguide structure comprising:
- a substrate;
- a waveguide material over the substrate, wherein the waveguide material has a thickness less than or equal to about 100 nanometers and allows propagation of light; and
- a first metal grating having a first pitch in the waveguide material, wherein a depth of the first metal grating is less than the thickness of the waveguide material, and a top surface of the first metal grating is substantially coplanar with a top surface of the waveguide material.

17. The waveguide structure of claim 16, wherein the waveguide material comprises silicon dioxide ($SiO_2$) silicon carbide (SiC), carbon nitride (CN), silicon oxynitride (SiON), silicon nitride ($SiN_x$).

18. The waveguide structure of claim 17, further comprising a second metal grating having a second pitch different form the first pitch.

19. The method of claim 1, wherein a depth of the first set of openings is formed to be shallower than the thickness of the waveguide material.

20. The method of claim 1, wherein filling the first set of openings with a metal material further comprises filling the first set of openings in portions and forming a barrier layer between each portion.

* * * * *